US010546503B2

(12) United States Patent
Chenchu et al.

(10) Patent No.: US 10,546,503 B2
(45) Date of Patent: Jan. 28, 2020

(54) METHOD AND SYSTEM FOR REAL-TIME VALIDATION OF AN OPERATIONAL FLIGHT PATH FOR AN AIRCRAFT

(71) Applicant: HONEYWELL INTERNATIONAL INC., Morris Plains, NJ (US)

(72) Inventors: Rajesh Chenchu, Andhra Pradesh (IN); Durga Prasad Dhulipudi, Andhra Pradesh (IN); Vijaya Bhaskar Ramisetti, Andhra Pradesh (IN); Reshma Seelam, Telangana (IN); Amit Srivastav, Karnataka (IN); Don Nicholas, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 233 days.

(21) Appl. No.: 15/683,267

(22) Filed: Aug. 22, 2017

(65) Prior Publication Data

US 2019/0066518 A1 Feb. 28, 2019

(51) Int. Cl.
*G08G 5/04* (2006.01)
*G08G 5/00* (2006.01)
*G01S 13/94* (2006.01)

(52) U.S. Cl.
CPC ......... *G08G 5/0034* (2013.01); *G08G 5/0013* (2013.01); *G08G 5/0021* (2013.01); *G08G 5/0086* (2013.01); *G08G 5/045* (2013.01)

(58) Field of Classification Search
CPC . G08G 5/00; G08G 5/04; G01S 13/94; C05D 1/00
USPC .......................................................... 701/120
See application file for complete search history.

(56) References Cited

U.S. PATENT DOCUMENTS 4,495,483 A 1/1985 Bateman
6,940,427 B2 9/2005 Bateman
7,194,353 B1 * 3/2007 Baldwin ............... G01C 21/00 701/301
7,352,292 B2 4/2008 Alter et al.
7,444,211 B2 10/2008 Charles
8,234,020 B1 7/2012 Wichgers et al.
(Continued)

FOREIGN PATENT DOCUMENTS

EP 2731089 A2 5/2014
WO 2016/149039 A1 9/2016

OTHER PUBLICATIONS

Extended EP Search Report for Application No. 18188377.8 dated Jan. 3, 2019.

*Primary Examiner* — Tan Q Nguyen
(74) *Attorney, Agent, or Firm* — Lorenz & Kopf, LLP

(57) ABSTRACT

A method for validating an operational flight path of an aircraft has been developed. First, a flight path for the aircraft is created using navigation, terrain and obstacle data retrieved from off-line databases. Next, real-time terrain and obstacle update information is captured from flight data sensors on board the aircraft while in flight. Also, light direction and range (LIDAR) data from LIDAR sensors on board the aircraft is collected. A boundary profile is calculated for the flight path based upon the real-time terrain and obstacle update information in combination with the LIDAR data. The flight path is validated using the boundary profile. The results of the validation of the flight path is generated as a report for the aircraft crew.

16 Claims, 8 Drawing Sheets

(56) References Cited

U.S. PATENT DOCUMENTS

| | | | | |
|---|---|---|---|---|
| 8,600,589 | B2 * | 12/2013 | Mendez-Rodriguez .................... | G01S 17/89 701/16 |
| 9,542,851 | B1 | 1/2017 | Kim et al. | |
| 9,575,489 | B2 | 2/2017 | Roger et al. | |
| 2002/0116097 | A1 | 8/2002 | Block et al. | |
| 2003/0036827 | A1 * | 2/2003 | Murphy ................ | G01C 11/02 701/3 |
| 2004/0111192 | A1 * | 6/2004 | Naimer ................ | G01C 21/005 701/9 |
| 2007/0055418 | A1 * | 3/2007 | Pire ......................... | G01S 13/94 701/14 |
| 2009/0291418 | A1 | 11/2009 | Srivastav et al. | |

* cited by examiner

500

METHOD AND SYSTEM FOR REAL-TIME VALIDATION OF AN OPERATIONAL FLIGHT PATH FOR AN AIRCRAFT

TECHNICAL FIELD

The present invention generally relates to generating operational flight paths for aircraft, and more particularly relates to a method and system for real time validation of an operational flight path for an aircraft.

BACKGROUND

Planning an operational flight path is a key element in effective aircraft operations. Electronic navigational databases along with terrain and obstacle databases have become important in flight path planning. However, some forecasts predict increases in database size of approximately 3% to 8% annually for the foreseeable future. As these databases get more larger and more complex, using the most up-to-date information and data in flight path planning and operations becomes more important. Hence, there is a need for a method and system for real-time validation of an operational flight path for an aircraft.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for validating an operational flight path for an aircraft. The method comprises: creating a flight path for an aircraft utilizing navigation, terrain and obstacle data retrieved from off-line databases; capturing real-time terrain and obstacles update information from flight data sensors on board the aircraft while in flight; capturing light direction and range (LIDAR) data from LIDAR sensors on board the aircraft while in flight; calculating a boundary profile for the flight path based upon the real-time terrain and obstacle update information in combination with the LIDAR data; validating the flight path using the boundary profile; and generating a validation report of the flight path for the aircraft crew.

A system is provided for validating an operational flight path for an aircraft. The system comprises a flight management system (FMS) on board the aircraft that electronically stores the operational flight path that was created utilizing navigation, terrain and obstacle data retrieved from off-line databases; a light direction and range (LIDAR) sensor located on board the aircraft that collects terrain and obstacle data while the aircraft is in flight; a communication system on board the aircraft that receives real-time terrain and obstacle update data while the aircraft is in flight; and where the FMS collects the LIDAR terrain and obstacle data and the real-time terrain and obstacle update data, calculates a boundary profile for the operational flight path based upon the real-time terrain and obstacle update data in combination with the LIDAR terrain and obstacle data, validates the operational flight path using the boundary profile, and generates a validation report of the operational flight path.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method and system for validating an operational flight path for an aircraft in real time has been developed. Some embodiments will utilize information from off-line databases in combination with the update information for the databases and the latest capture of terrain and obstacle change information using onboard aircraft sensors to generate real-time validation of a flight path. Some embodiments may generate a validation report is and message alerts that are sent to the air crew to provide notice of deviations from the flight path boundaries. Additionally, other embodiments could use various visual representations of the flight path and its' validation including: a two-dimensional representation a vertical profile of the terrain; a three-dimensional visualization; and a 360° three-dimensional based viewing representation.

Figure 1:
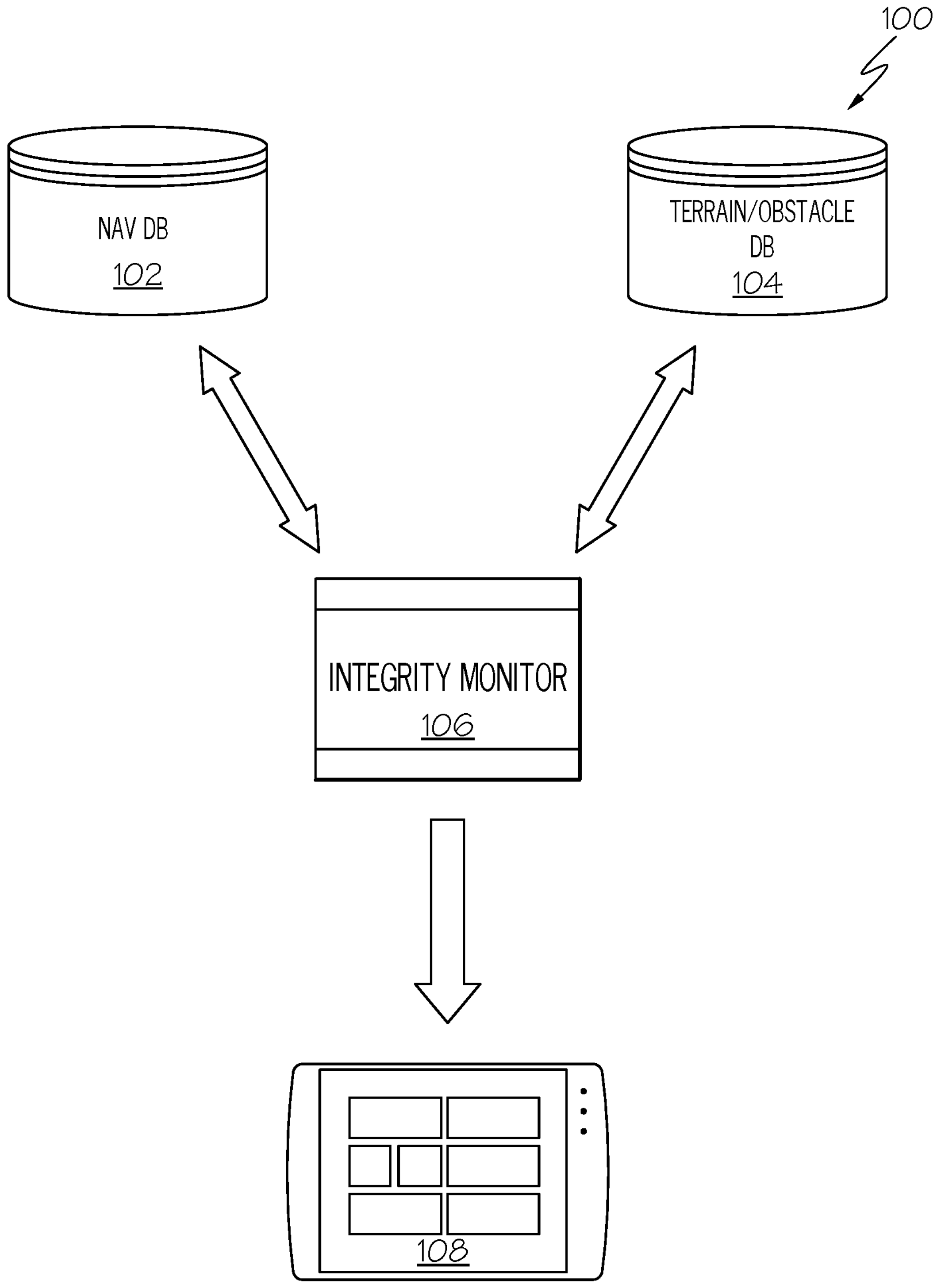
FIG. 1 shows a block diagram of an operational flight path integrity monitoring and reporting system in accordance with one embodiment.

FIG. 1 shows a block diagram 100 of an operational flight path validation system in accordance with one embodiment.

In this example, a navigational database 102 is used in combination with the terrain and obstacle database 104 to validate the operational flight path with an integrity monitor 106. Upon validation, the results of the integrity monitor 106 are sent to a display and reporting system 108 for use by an aircraft crew. The display and reporting system 108 is located in the cockpit onboard an aircraft in some embodiments.

Figure 2:
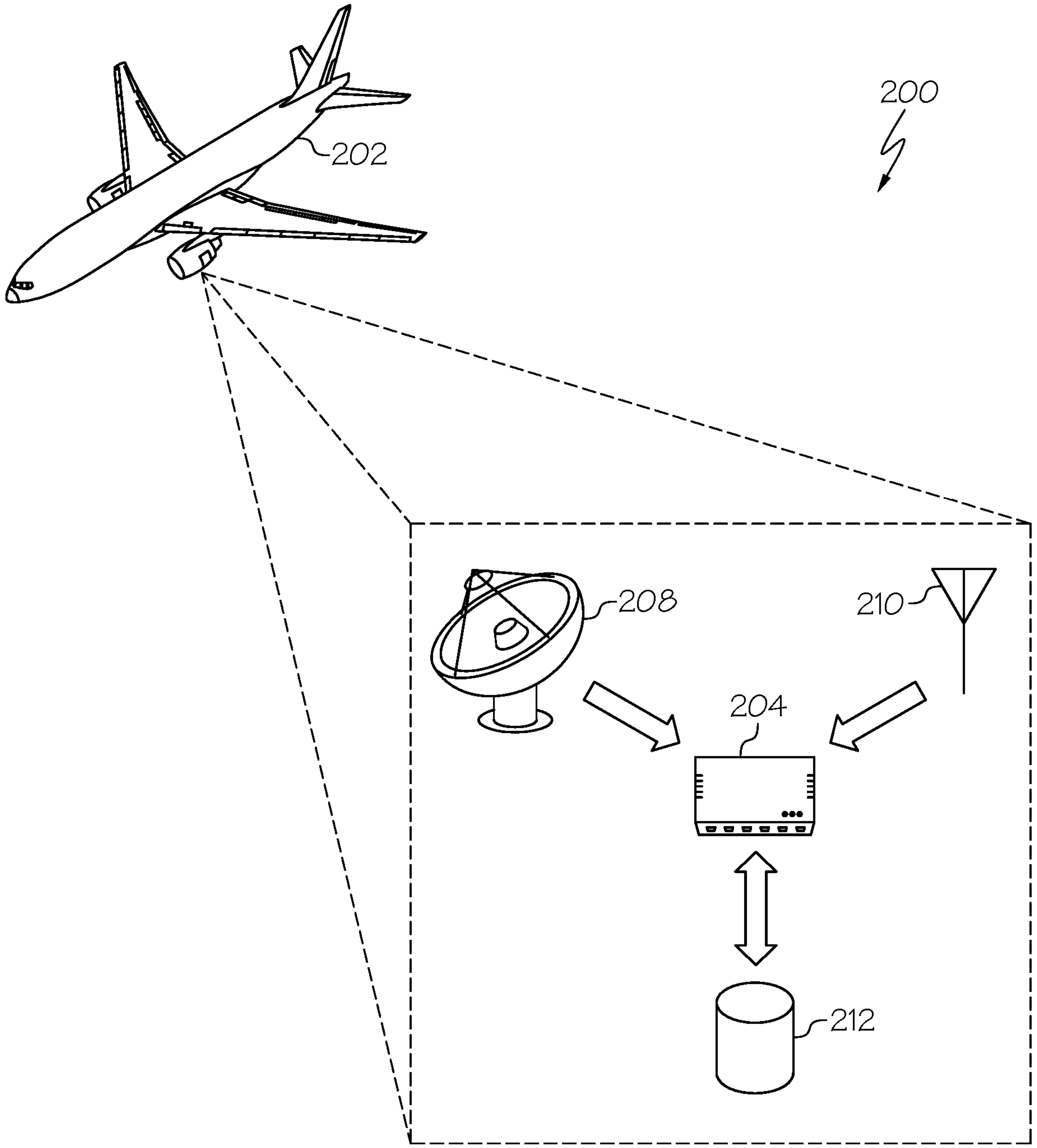
FIG. 2 shows a block diagram of a system for real-time validation of a flight path on board an in-flight aircraft in accordance with one embodiment.

FIG. 2 shows a block diagram of a system for real-time validation of a flight path 200 on board an in-flight aircraft in accordance with one embodiment. The system is located and operated on board an in-flight aircraft 202. The system includes a flight management system (FMS) 204 that electronically stores and validates the operational flight path. During flight, the FMS 204 receives terrain and obstacle information from an onboard light direction and range (LIDAR) sensor 210. Additionally, the FMS 204 receives updated terrain and obstacle information from communication systems and flight data sensors 208 located on board the aircraft. Examples of these flight data sensors include: Infra-red (IR) Sensors; Radar; Cameras; Pilot Reports (PiReps) from other aircraft; etc. The FMS 204 collects the updated data and validates the operational flight path while the aircraft 202 is in flight. Upon validation by the FMS 204, a validation report is created and stored in an onboard electronic log repository 212 for later retrieval. The validation reports from previous cycles may be retrieved from the log repository 212 and analyzed for content using text mining techniques. The contents of the validation reports are combined and used to generate a descriptive alert message for the aircrew by the FMS 204.

Figure 3:
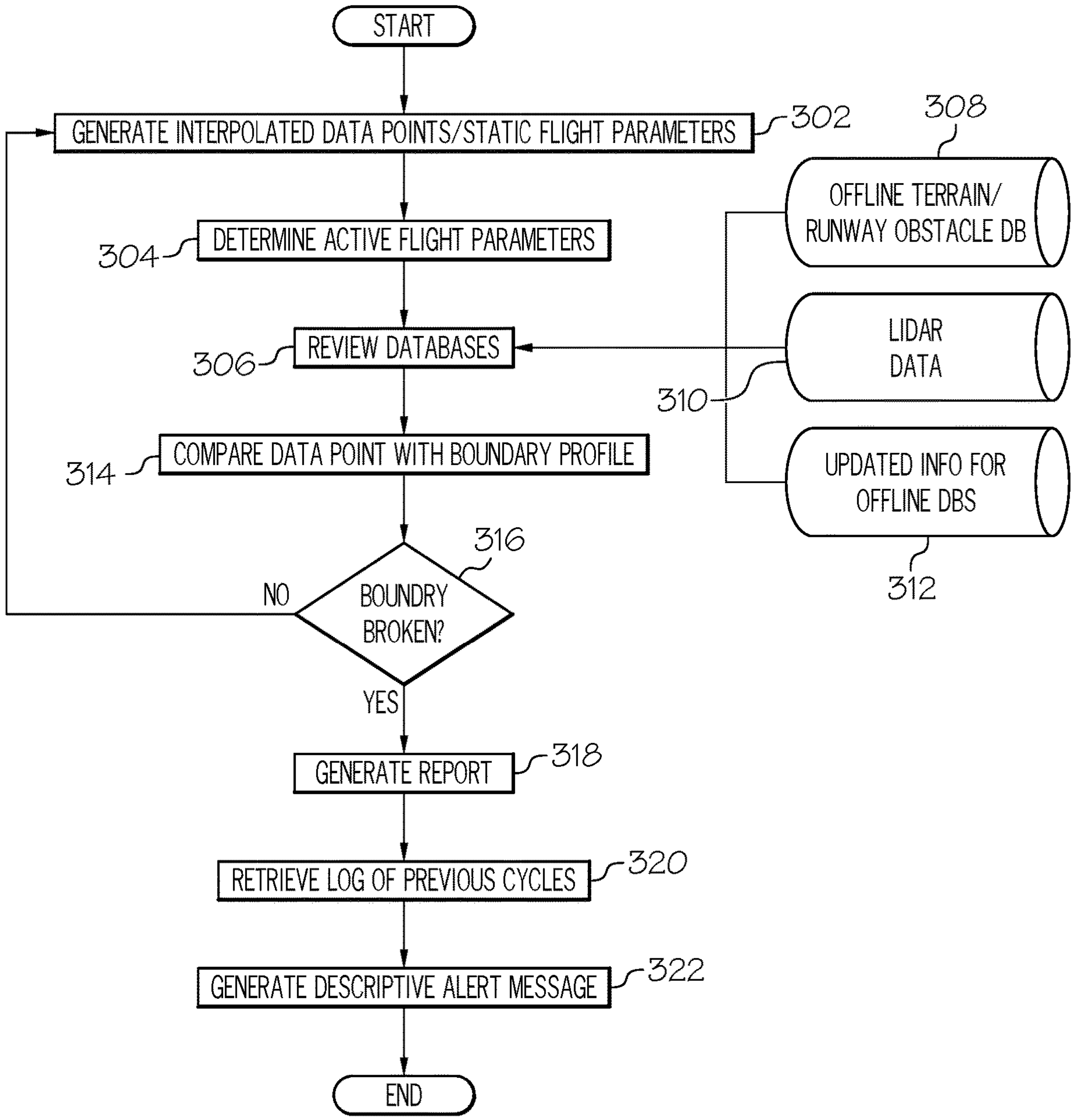
FIG. 3 shows a flowchart of a method of real-time validation of an operational flight path for an aircraft in accordance with one embodiment.

FIG. 3 shows a flowchart of one embodiment of a method of real-time validation of an operational flight path. First, the method will generate a series of interpolated sample points along a proposed flight path 302. The interpolated data points will be generated without any discontinuities. The proposed flight path has been entered into the system as part of pre-flight planning. Next, the method will collect the static flight parameters of the flight plan for the aircraft 304. Examples of these static flight parameters include: origination; destination; desired flight path; operational ceiling; estimated flight time; etc. The method will also collect active flight parameters 304 for the inflight aircraft such as current weather conditions; visibility; airspeed; altitude; heading; etc.

Data that has been previously collected from off-line databases and stored on board an FMS on board the aircraft. The information from these off-line databases is used to determine the characteristics of the terrain, obstacles and destination runway along the proposed flight path 308. While these off-line databases are periodically updated, this information is considered static and in need of real-time verification and confirmation especially during flight. Additional real-time data is collected from LIDAR sensors on board the aircraft 310. Also, update information on terrain and obstacles is collected from other sensors on board the aircraft 312. Examples of these sensors include: Infra-red (IR) Sensors; Radar; Cameras; Pilot Reports (PiReps) from other aircraft; etc. All of the available information from the database and the sensors is gathered and reviewed 306 to create a boundary profile along the flight path.

Each interpolated data point is individually compared with the boundary profile 314. If the boundary is not broken, the next data point in the series along the flight path is analyzed. However, if the boundary is broken, a validation report is generated 318 and stored in a log repository for later retrieval. The validation reports from previous cycles of analysis are retrieved from the log 320 and analyzed for content using text mining techniques. The contents of the validation reports are combined and used to generate a descriptive alert message for the aircrew 322.

Figure 4:
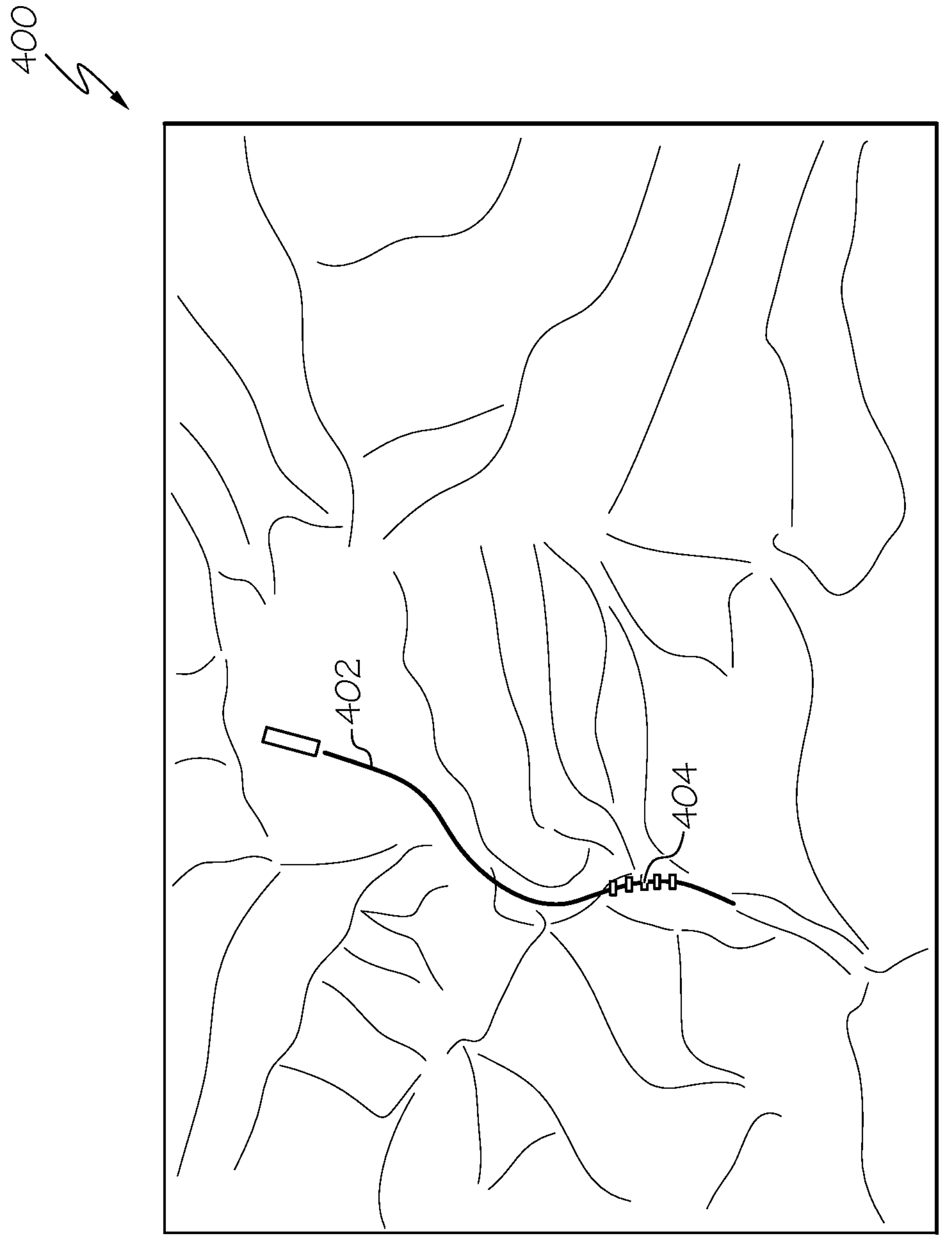
FIG. 4 shows a two-dimensional representation of a flight path with a highlighted warning region in accordance with one embodiment.
Figure 5:
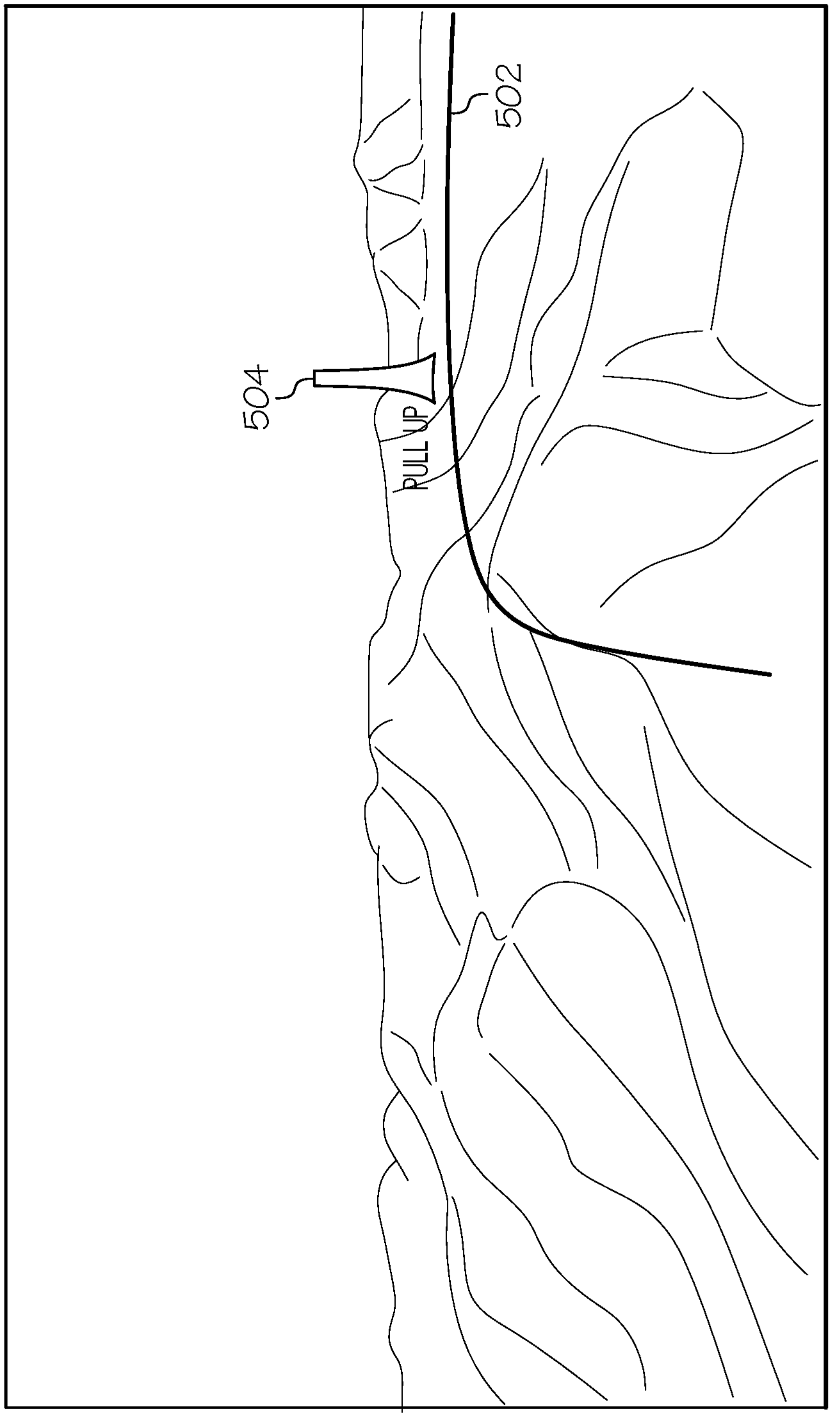
FIG. 5 shows a three-dimensional representation of a flight path with a highlighted warning region in accordance with one embodiment.
Figure 6:
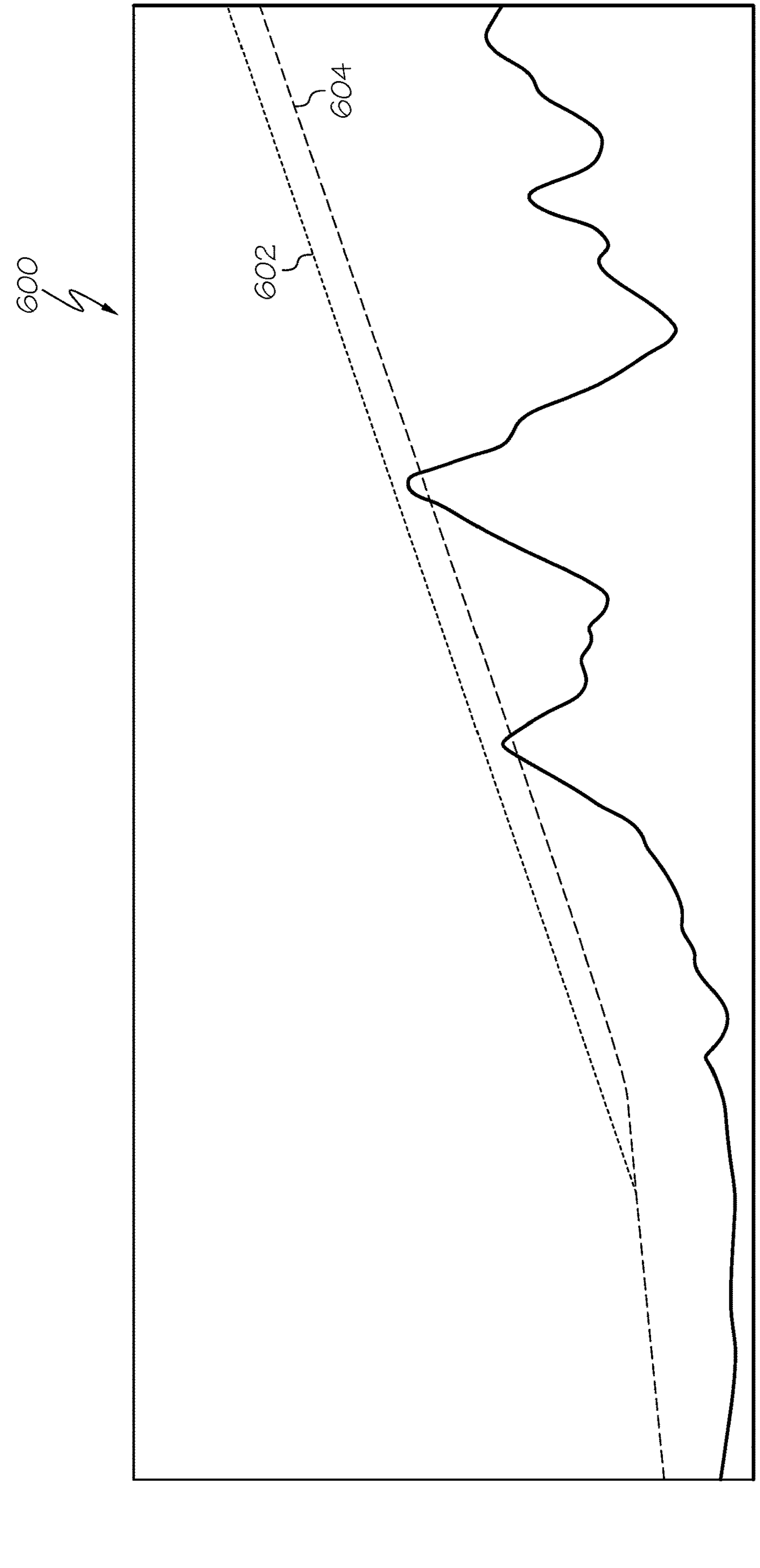
FIG. 6 shows a vertical terrain profile with caution and warning boundaries in accordance with one embodiment.

The descriptive alert message may be aural, visual or combination of both in some embodiments. The visual alert message may be a two-dimensional display, a three-dimensional display, a vertical terrain profile which may or may not include boundary profile indicators, or a 360° display in a "virtual reality" format. FIG. 4 shows an example of a depiction of a two-dimensional display 400 with the flight path 402 with an identified area of broken boundary profiles 404. FIG. 5 shows an example of a three-dimensional display 500 with a flight path 502 and an identified area of broken boundary profiles 504. Additionally, an alert instruction of "Pull-Up" is shown in the broken boundary profile area 404. FIG. 6 shows an example of a depiction of a vertical terrain profile 600 with a warning boundary profile 602 and a caution boundary profile 604. These profiles have different boundary parameters with respect to terrain and obstacles and as such will prompt different alert messages if the respective boundary profiles are broken.

Figure 7:
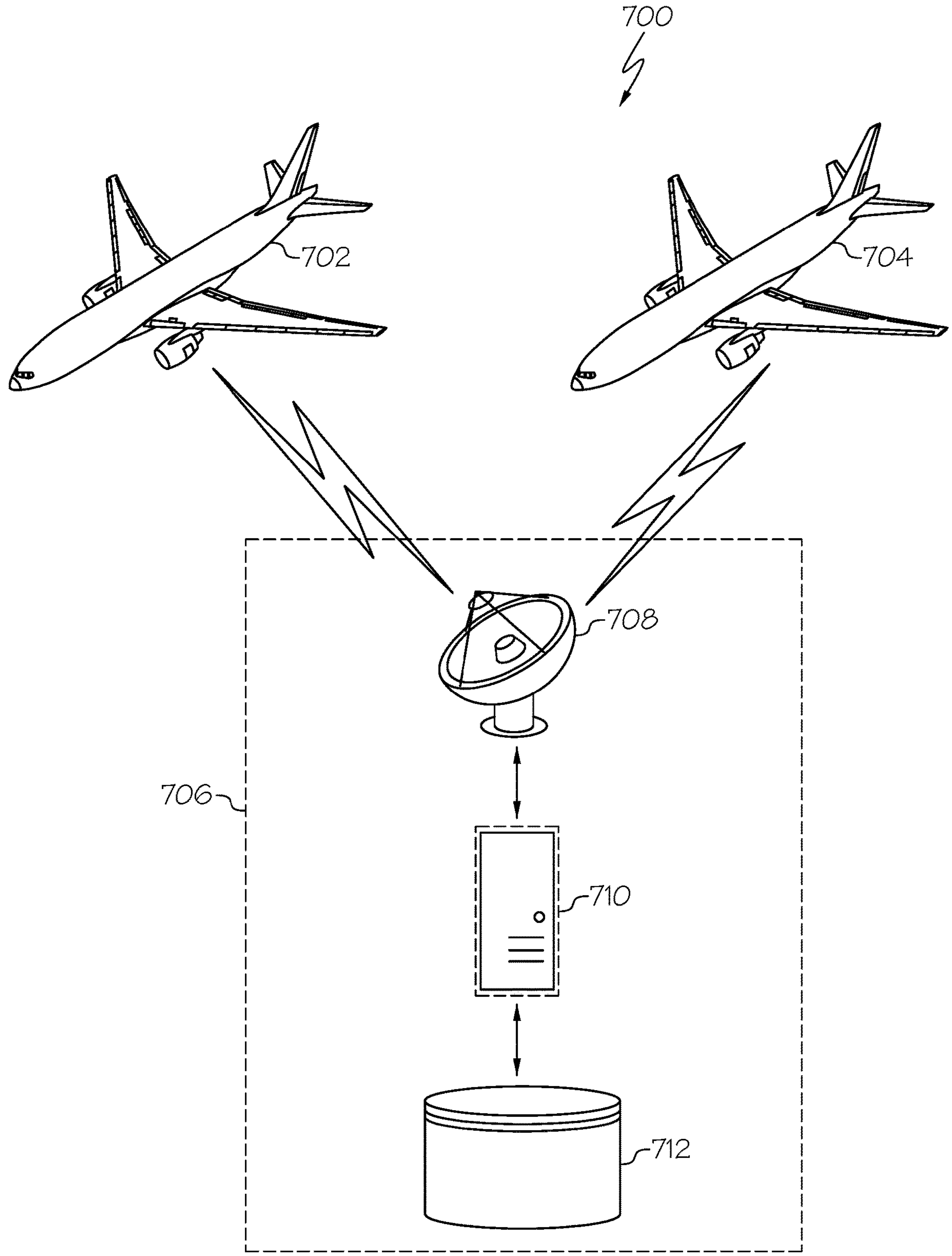
FIG. 7 shows a block diagram of a system for real-time validation of a flight path with a ground station and multiple in-flight aircraft with in accordance with one embodiment.

In alternative embodiments, an operational flight path may be validated between multiple aircraft with the use of a ground-based system. FIG. 7 shows an example of a block diagram of a system 700 for real-time validation of a flight path with a ground station 706 and multiple in-flight aircraft 702 and 704 with in accordance with one embodiment. An in-flight aircraft with an onboard flight path validation system and sensors 702 as previously shown in FIG. 2, collects and validates real-time terrain and obstacle data along with the LIDAR data as previously described. The data from the aircraft 702 is downloaded via a data communications link 708 to a server 710 at the ground station 706. The server 710 stores the real-time terrain and obstacle data along with the LIDAR data in electronic database 712 for later retrieval. Upon request by a second in-flight aircraft 704, the ground-based system 706 will retrieve the data from the electronic database 712 with the server 710 and transmit it to the second aircraft 704 via the data communications link 708. In this embodiment, a second aircraft 704 that may lack the flight data and LIDAR sensors of the first aircraft 702 may still have its flight path by validated in the same manner as the first aircraft 702.

Figure 8:
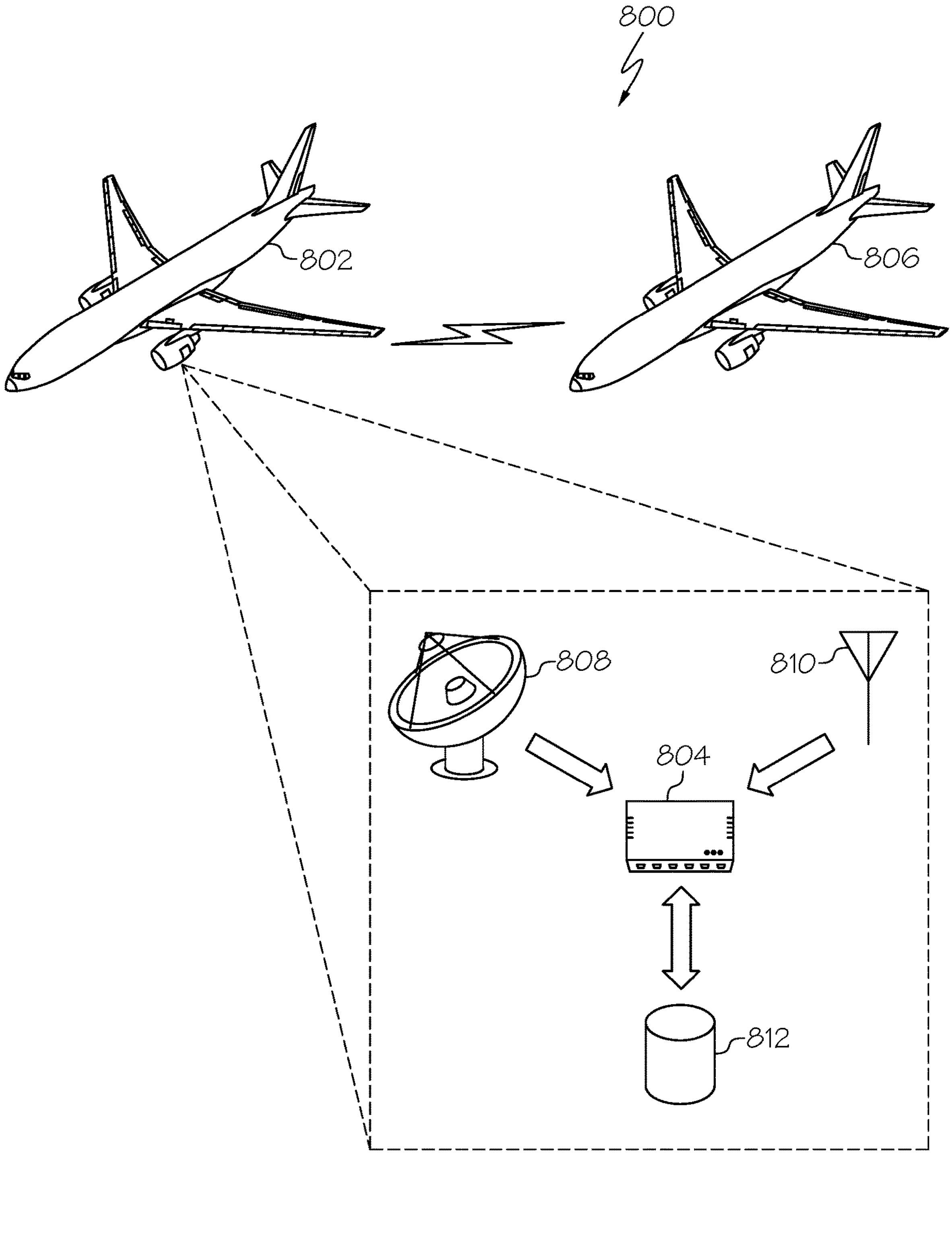
FIG. 8 shows a block diagram of a system for real-time validation of a flight path with multiple in-flight aircraft with in accordance with one embodiment.

In alternative embodiments, an operational flight path may be validated between multiple aircraft while in flight. FIG. 8 shows an example of a block diagram of a system 800 for real-time validation of a flight path between two in-flight aircraft 802 and 806. An in-flight aircraft 802 with an onboard flight path validation system and sensors 804, 808, 810 and 812 as previously shown in FIG. 2, collects and validates real-time terrain and obstacle data along with the LIDAR data as previously described. The data from the aircraft 802 is transmitted via a data communications link to a second in-flight aircraft 806 upon request. In this embodiment, a second aircraft 806 that may lack the flight data and LIDAR sensors of the first aircraft 802 may still have its flight path validated in the same manner as the first aircraft 802. While the sharing of terrain, obstacle and lidar data is shown between only two aircraft, it should be clear that data from the first aircraft 802 may be provided to multiple aircraft in other embodiments.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as “first,” “second,” “third,” etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as “connect” or “coupled to” used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for validating an operational flight path for an aircraft, comprising:

- creating a flight path for an aircraft utilizing navigation, terrain and obstacle data retrieved from off-line databases;
- capturing real-time terrain and obstacles update information from flight data sensors on board the aircraft while in flight;
- capturing light direction and range (LIDAR) data from LIDAR sensors on board the aircraft while in flight;
- calculating a boundary profile for the flight path based upon the real-time terrain and obstacle update information in combination with the LIDAR data;
- validating the flight path using the boundary profile;
- generating a validation report of the flight path for the aircraft crew; and
- storing the validation report in a on board log repository for later transmission of an update to a ground based electronic database that receives and stores the real-time terrain and obstacle update information in combination with the LIDAR data.

2. The method of claim 1, further comprising:

- generating a descriptive alert message based on any violations of the boundary profile.

3. The method of claim 2, where the descriptive alert message is generated based on analysis of retrieved previous validation reports from the log repository.

4. The method of claim 3, where the analysis of previous validation reports is conducted through text mining.

5. The method of claim 2, where the descriptive alert message is visual.

6. The method of claim 2, where the descriptive alert message is aural.

7. The method of claim 1, further comprising:

- creating a two-dimensional representation of the flight path that highlights any warning environments for the aircraft.

8. The method of claim 1, further comprising:

creating a three-dimensional representation of the flight path that highlights any warning environments for the aircraft.

9. The method of claim 8, where the three-dimensional representation of the flight path is displayed as a 360° visualization of the terrain and obstacles along the flight path.

10. The method of claim 1, further comprising:

creating a vertical terrain profile representation of the flight path that highlights any warning environments for the aircraft.

11. A system for validating an operational flight path for an aircraft, comprising:

a flight management system (FMS) on board the aircraft that electronically stores the operational flight path that was created utilizing navigation, terrain and obstacle data retrieved from off-line databases;

a light direction and range (LIDAR) sensor located on board the aircraft that collects terrain and obstacle data while the aircraft is in flight;

a communication system on board the aircraft that receives real-time terrain and obstacle update data while the aircraft is in flight;

where the FMS collects the LIDAR terrain and obstacle data and the real-time terrain and obstacle update data, calculates a boundary profile for the operational flight path based upon the real-time terrain and obstacle update data in combination with the LIDAR terrain and obstacle data, validates the operational flight path using the boundary profile, and generates a validation report of the operational flight path;

a log repository that stores validation reports for later retrieval by the FMS of the in-flight aircraft;

a ground-based server with a data communications link in contact with the FMS of the in-flight aircraft, where the ground-based server receives the real-time terrain and obstacle update data in combination with the LIDAR terrain and obstacle data;

an electronic database in communication with the ground-based server, where the electronic database receives and stores the real-time terrain and obstacle update data in combination with the LIDAR terrain and obstacle data for later retrieval; and where the ground-based server transmits the real-time terrain and obstacle update data and the LIDAR terrain and obstacle data to a second in-flight aircraft.

12. The system of claim 11, where the FMS generates a descriptive alert message for the crew of the aircraft based on any violations of the boundary profile.

13. The system of claim 12, where the descriptive alert message is aural.

14. The system of claim 12, where the descriptive alert message is visual.

15. The system of claim 12, where the descriptive alert message is displayed on a mobile device on board the aircraft.

16. The system of claim 12, further comprising:

a data communications link on board the in-flight aircraft that provides the real-time terrain and obstacle update data in combination with the LIDAR terrain and obstacle data directly to a second aircraft.

* * * * *